United States Patent [19]

DeCaro

[11] Patent Number: 4,605,348

[45] **Date of Patent: * Aug. 12, 1986**

[54] QUICK RELEASE ADAPTER

[75] Inventor: Charles J. DeCaro, Pittsburgh, Pa.

[73] Assignee: Textron Inc., Providence, R.I.

[ * ] Notice: The portion of the term of this patent subsequent to Jan. 1, 2002 has been disclaimed.

[21] Appl. No.: 437,542

[22] Filed: Oct. 29, 1982

[51] Int. Cl.[4] .......... B23B 31/10

[52] U.S. Cl. .......... 408/239 A; 408/226; 279/14; 279/35; 279/79; 279/89; 279/97

[58] Field of Search .......... 279/16, 77, 76, 75, 279/79, 84, 89, 97, 106, 35, 14, 24, 17, 18, 1 C; 408/226, 186, 187, 239 A; 403/330, 328, 324, 325

[56] References Cited

U.S. PATENT DOCUMENTS

| | | | |
|---|---|---|---|
| 820,263 | 5/1906 | Schmid | 279/18 |
| 1,428,754 | 9/1922 | Carr | 279/18 |
| 2,095,852 | 10/1937 | Booth | 279/76 |
| 2,324,130 | 7/1943 | Beckwith | 279/18 |
| 2,671,667 | 3/1954 | Flory | 279/18 |
| 3,023,015 | 2/1962 | Pankow | 279/14 |
| 4,057,260 | 11/1977 | Sigott | 279/76 |
| 4,402,519 | 9/1983 | Meaden et al. | 279/76 |
| 4,491,443 | 1/1985 | DeCaro | 339/226 |

FOREIGN PATENT DOCUMENTS

| | | | |
|---|---|---|---|
| 0500696 | of 1920 | France | 279/18 |

*Primary Examiner*—Gil Weidenfeld
*Assistant Examiner*—Thomas M. Kline
*Attorney, Agent, or Firm*—Webb, Burden, Robinson & Webb

[57] ABSTRACT

An adapter for a torquing tool includes an elongated body having a bore at at least one end to accommodate a working member such as a drill bit or fastener driver and a coupling means for detachably attaching the body to the tool. The improvement comprises a quick release means internal of the body member to detachably retain the working member within the bore and to the elongated body. The preferred quick release means is a spring loaded shuttle positioned in an opening radially through the body member and in communication with the bore.

1 Claim, 11 Drawing Figures

QUICK RELEASE ADAPTER

FIELD OF THE INVENTION

My invention relates to adapters for drilling and torquing tools and more particularly, to adapters and reversible adapters for use with a standard power unit for drilling a hole and thereafter for torquing a fastener into the hole just drilled.

DESCRIPTION OF THE PRIOR ART

There are many applications which require a power drill to form a hole in the workpiece and a power installation tool to set a fastener in the predrilled hole. It is already known to use a single power unit and provide a number of interchangeable bits to perform the drilling function and the torquing function. In my co-pending application Ser. No. 353,223 filed Mar. 1, 1982 I disclose a reversible drilling and torquing adapter which comprises an elongated body member having an opening at one end to accommodate a drill bit and an opening at the opposite end to accommodate a fastener driver. The adapter is externally symmetrical and self-contained so that either end is readily attachable to the power unit or an elongated sleeve which attaches to the power unit. The drill bit and the fastener driver are retained in their respective ends of the adapter by means of set screws extending radially through the adapter and in communication with the axial bores which house the bit and driver.

In many applications the worker is on scaffolding or ladders or in some other location where it is not convenient to loosen the set screw and change the drill bit or fastener driver. This is particularly a problem with respect to the drill bit since drill bit life is unpredictable both as to standard wear and to accidental breakage.

Quick release mechanisms for drills are already known for use with standard tooling. However, these quick release mechanisms are in the form of spring loaded chucks with ball retainers which are external of the elongated sleeve of the power unit. In addition, these quick release chucks accommodate only large drills. Presently quick release means are not available for adapters used in combination drilling and torquing tools.

SUMMARY OF THE INVENTION

I have now provided a quick release mechanism which is not cumbersome and which is particularly applicable to adapters and reversible adapters for drill bits and fastener drivers. The quick release mechanism is compact and contained internal of the adapter. My quick release mechanism provides for rapid and easy changing of drill bits and the like and requires no additional tooling such as screw drivers or allen wrenches to accomplish the tool change.

My improvement is directed to an adapter for a torquing tool, including an elongated body member having a bore at at least one end to accommodate a working member and a coupling means for detachably attaching the body to the tool. The improvement comprises quick release means internal of the body member to detachably retain the working member within the bore and to the elongated body. A preferred quick release means includes a spring loaded shuttle positioned in an opening extending radially through the body member with the shuttle being movable between a first position locking the working member in the bore and a second position for releasing the working member.

My quick release means finds particular application in a reversible adapter having a fastener driver at one end and a drill bit at the other with the quick release means being adaptable to either or both ends of the adapter. Non-spring loaded shuttles which are rotatable in the body member to line up various slot and groove arrangements in conjunction with a particularly configured working member may also be employed.

DESCRIPTION OF THE PREFERRED EMBODIMENTS

Figure 1:
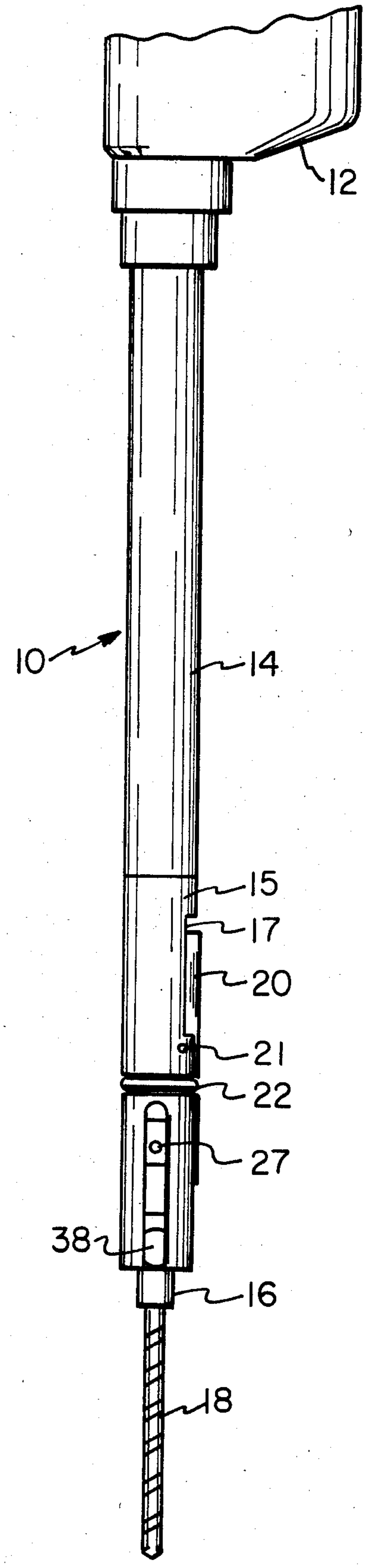
FIG. 1 is a front elevation of a power tool including a sleeve and adapter.

The tool, generally designated 10, comprises a power unit 12, an elongated sleeve 14 attached to the power unit 12 and a sleeve extension 15 attached to the elongated sleeve 14 by conventional means which do not form a part of the subject invention, FIG. 1. A reversible adapter 16 is attached to the distal end of the sleeve extension 15 and the two sleeves and adapter are caused to rotate by the power unit 12.

Figure 2:
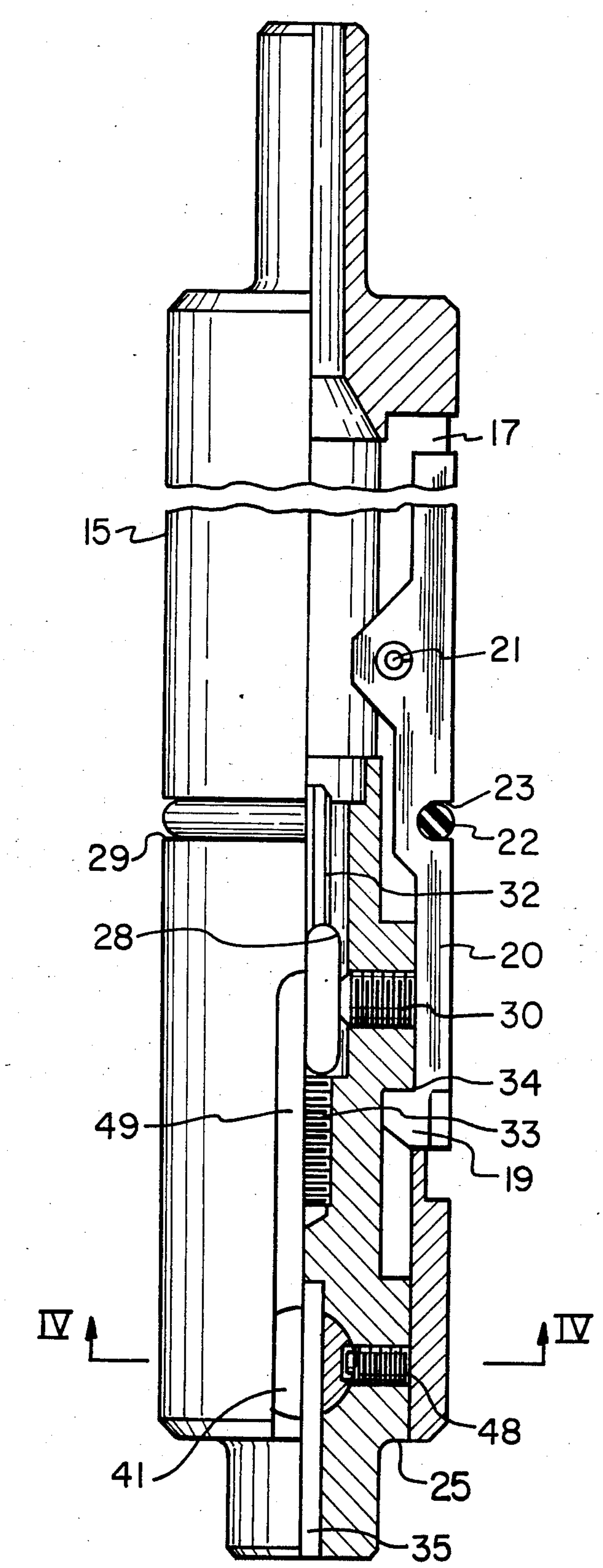
FIG. 2 is a front elevation partly in section showing the sleeve and adapter.

The sleeve extension 15 includes a slot 17 which accommodates a latch member 20 by means of pivot pin 21 extending through the sleeve and transverse of the slot, FIG. 2. O-ring 22 is housed within slot 29 of sleeve extension 15 and slot 23 in latch member 20 so as to maintain latch member 20 in the closed position. Latch member 20 terminates in an inwardly extending finger 19 which detachably retains the adapter 16 within the bore of sleeve extension 15. A driving tool conforming in shape to the head of the screw to be driven, e.g. a hex-shaped fastener driver 32, is secured within a blind bore 28 extending into one end of the adapter 16 by means of a set screw 30 which extends radially through the adapter wall and into the bore 28. An adjustment screw 33 is located at the blind end of the bore 28 to effect depth adjustments to the fastener driver.

Figure 3:
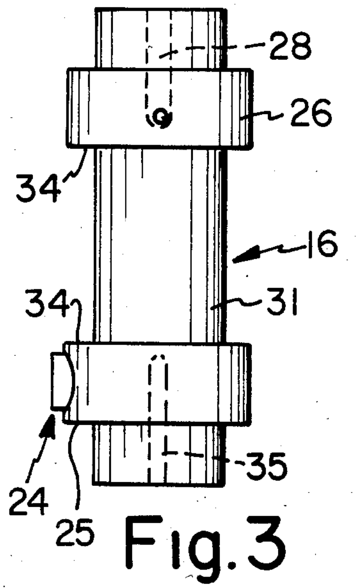
FIG. 3 is a front elevation of the reversible adapter.

The adapter 16 comprises an elongated cylindrical body 31 having an enlarged cylindrical section 25 inward of one end and an enlarged cylindrical section 26 inward of the other end, FIG. 3. Each enlarged section defines a shoulder 34 against which finger 19 of latch member 20 engages so as to retain the adapter 16 in the sleeve extension 15. Depression of the latch member 20 causes pivoting about the pin 21 and disengages the finger 19 from the shoulder 34 permitting the adapter to be removed and/or reversed, FIG. 2. A bore 35 extends in the opposite end of the adapter 16 from bore 28 to accommodate a drill bit 18 as will be described hereinafter.

Figure 10:
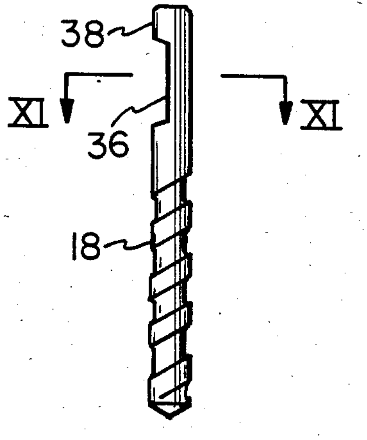
FIG. 10 is a front elevation of a drill adapted for use with my invention.
Figure 11:
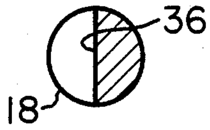
FIG. 11 is a planned view of the drill of FIG. 10.

The drill bit 18 includes a flattened shank 36 of hemispherical cross section spaced between the drilling portion and the end section 38, FIGS. 10 and 11.

Figure 5:
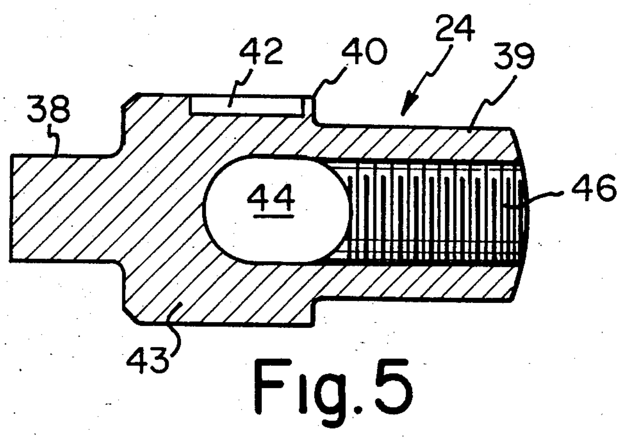
FIG. 5 is a section through a shuttle.

The quick release mechanism is housed within an opening 41 extending radially through the adapter and into the bore 35, FIG. 2. The major component of the quick release mechanism is the shuttle 24, FIG. 5. Shuttle 24 includes an enlarged central section 43 which is dimensioned for sliding engagement within opening 41 of adapter 16. A lug 38 extends outwardly from central section 43 at one end and a reduced end section 39 including an axial threaded bore 46 extends outwardly from the other end. A retaining slot 42 is located along a portion of the central enlarged section 43. A central opening 44 extends through the central section 43 and in communication with bore 46.

Figure 4:
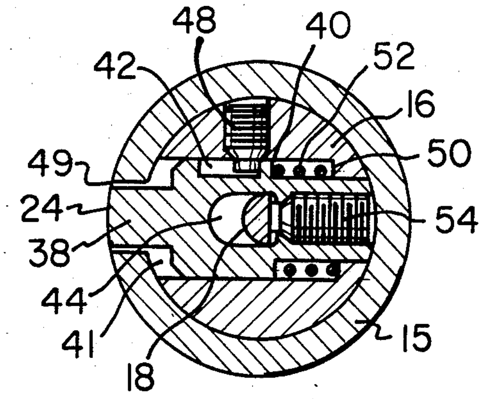
FIG. 4 is a section taken along section lines IV—IV of FIG. 2 and including a drill bit.

The positioning of the shuttle 24 in the adapter 16 and sleeve extension 15 is best seen in FIG. 4. A set screw 48 extends through adapter 16 and terminates in slot 42 of shuttle 24 so as to retain shuttle 24 within opening 41. Lug 38 extends out of opening 41 and through slot 49 in sleeve extension 15, FIGS. 2 and 4. Shuttle 24 is spring loaded by means of coil spring 52 housed between shoulder 40 of shuttle 24 and shoulder 50 formed within the opening 41 and internal of the adapter 16. An appropriately tipped set screw 54 threadably engages threaded bore 46 in the reduced end section 39 of shuttle 24 so as to extend into the clear through opening 44.

In operation, lug 38 is depressed inward causing compaction of coil spring 52. The drill 18 is positioned in the drill bore 35 all the way into opening 44 of the shuttle 24 and the shuttle 24 is then released causing the set screw 54 to contact the drill along the flattened shank 36 and below the end section 38. The contact between the set screw 54 and the flattened surface of the drill 18 causes the drill 18 to rotate with the adapter 16 and the elongated sleeve 14 and sleeve extension 15. To release the drill 18, lug 38 is depressed, permitting drill 18 to be easily removed and replaced. The screw 54 pushes against the drill and the shuttle is confined by the sleeve extension 15 so as to lock the screw 54 against the drill 18. The screw 54 permits adjustment of the shuttle 24 within the adapter 16. The adapter 16 is removed from sleeve extension 15 to permit depression of the lug 38 of shuttle 24.

Such a quick release mechanism could also be employed at the fastener driver end of the adapter. However, it is more practical at the drill bit end because of the more unexpected and greater need to change the drill bit.

Figure 6:
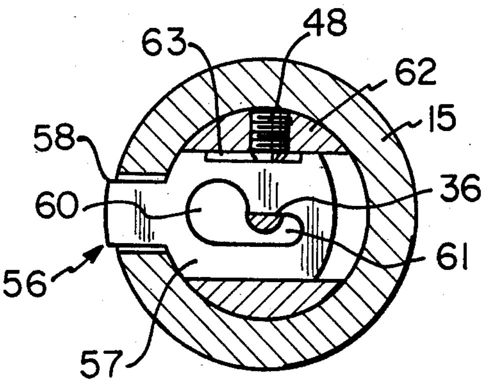
FIG. 6 is a front elevation of a modified shuttle and adapter in the closed position.
Figure 7:
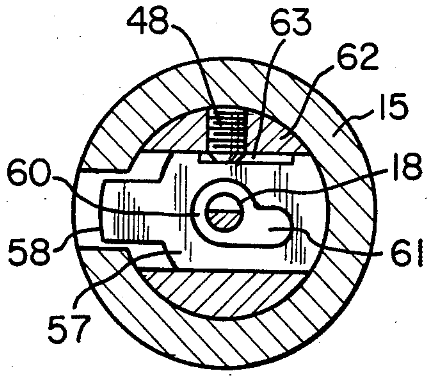
FIG. 7 is a front elevation of the shuttle and adapter of FIG. 6 in the open position.

A modified form of the shuttle is illustrated in FIGS. 6 and 7, which does not require a spring. In this embodiment, the shuttle 56 includes a lug 58 as in the earlier embodiment. The body section 57 of the shuttle 56 includes an enlarged opening 60 having a diameter to accommodate the drill shank diameter and an opening extension 61 continuous with opening 60 which is shaped to accommodate only the hemispherically flattened shank portion 36 of drill 18. A slot 63 extends along the periphery of body section 57 to accommodate the screw 48 extending through adapter 62 to retain the shuttle 56 in the adapter 62.

The embodiment of FIGS. 6 and 7 operates similar to the earlier described embodiment in that the shuttle is moved inward to release the drill shank (FIG. 7) and is moved outward to lock the drill shank (FIG. 6). Specifically, with the shuttle 56 moved inward the drill 18 is positioned in the enlarged opening 60 and is easily inserted or removed, FIG. 7. With the shuttle 56 moved outward, the flattened drill shank 36 is engaged in the opening extension 61 to lock the drill in place. This embodiment eliminates the need for the additional screw in the shuttle. A spring can be easily provided as in the earlier embodiment.

Figure 8:
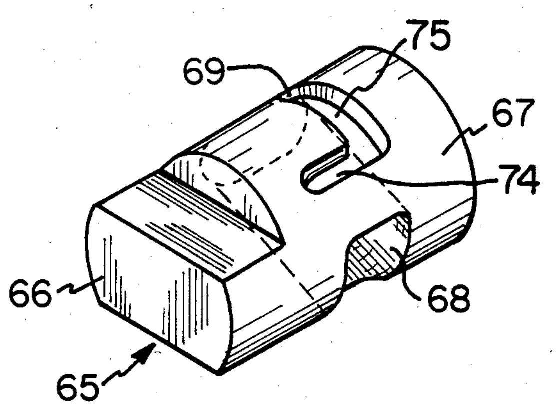
FIG. 8 is an isometric view of still a further modified form of a shuttle.
Figure 9:
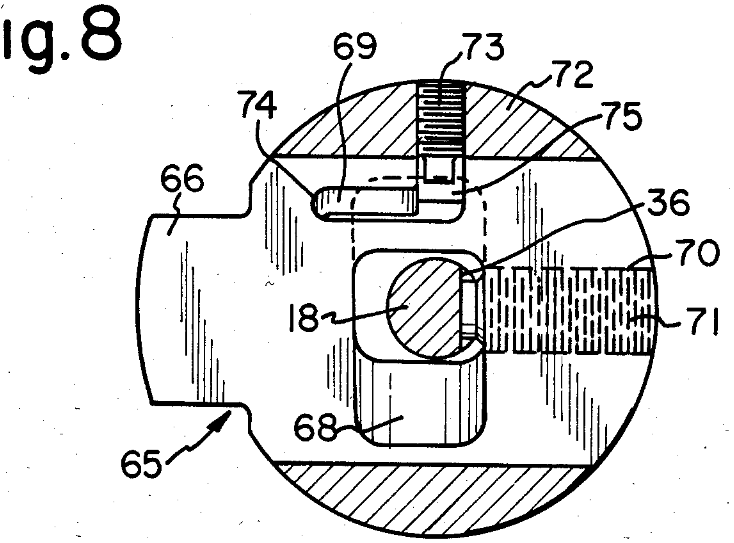
FIG. 9 is a front elevation of the shuttle of FIG. 8 and an adapter in slightly enlarged scale.

Another modified form of rotatable shuttle which does not require a spring is illustrated in FIGS. 8 and 9. The shuttle 65 includes a lug 66 and a contiguous body section 67 of substantially cylindrical configuration, FIG. 8. An enlarged slot 68 extends through the body section 67 and a J-shaped slot (bayonet type slot) 69 is recessed in the top of section 67. A threaded tap 70 extends longitudinally into slot 68 and houses an appropriately tipped set screw 71, FIG. 9.

The shuttle 65 is retained in the adapter 72 by means of set screw 73 which terminates in the J-slot 69. The drill 18 with its flattened face 36 is retained by set screw 71. The shuttle 65 is shown in the drive position in FIG. 9. To release the drill two separate actions are required. Initially, the shuttle 65 is gripped by the lug 66 and is rotated about an axis perpendicular to the longitudinal axis of the adapter so as to remove set screw 73 from the short leg 75 of slot 69 and place it in the long leg 74. Now there is no resistance to lateral movement and the shuttle can be depressed thereby freeing the drill 18. For this movement to occur, slot 68 must be sufficiently large to permit the rotation without hindrance from the drill. In other words, the clearance must be designed as a function of the angle of rotation so that the surfaces which define the slot do not engage the drill.

It is to be understood that the present invention is not limited to the particular structure shown in the drawings, but also includes any modification within the scope of the appended claims.

I claim:

1. In a reversible adapter for a power driven torquing tool, including an elongated cylindrical body having a bore extending inward from each of a first and second end and adapted to accommodate a fastener driver and a drill bit respectively, said adapter being connectable at both its first and second ends to the torquing tool so as to be reversible in relation thereto, the improvement comprising quick release means cooperating with at least one of said bores to detachably retain the driver or bit within the bore, said driver or bit having a flattened shank section said body including an opening radially therethrough and in communication with said at least one bore, and a shuttle, said shuttle including an axially extending threaded bore accommodating a first set screw for engaging the flattened shank section, a clear through slot extending transverse of the shuttle longitudinal axis and in communication with the threaded bore and a J-shaped peripheral slot accommodating a second set screw extending radially through said adapter, said shuttle being rotatable on an axis perpendicular to the longitudinal axis of the adapter between a first position wherein the second set screw is accommodated by a short leg of the J-shaped slot and a second position wherein the second set screw is accommodated by a long leg of the J-shaped slot, said shuttle being depressable to release the driver or bit in said second position.

* * * * *